United States Patent
Swamy et al.

[11] Patent Number: 5,987,553
[45] Date of Patent: Nov. 16, 1999

[54] ADAPTOR BOARD INTERCONNECTION FOR A PROCESSOR BOARD AND MOTHERBOARD

[75] Inventors: Deepak N. Swamy; Andrew W. Moore, both of Austin, Tex.

[73] Assignee: Dell Computer Corporation, Roundrock, Tex.

[21] Appl. No.: 08/935,127

[22] Filed: Sep. 22, 1997

[51] Int. Cl.⁶ .................................................. G06F 13/38
[52] U.S. Cl. ........................ 710/129; 710/62; 710/63; 710/64; 710/102; 395/500
[58] Field of Search .................... 395/281–283, 395/500, 882–885, 892; 710/129, 130; 361/686

[56] References Cited

U.S. PATENT DOCUMENTS

| | | | |
|---|---|---|---|
| 4,675,551 | 6/1987 | Stevenson et al. | 307/443 |
| 4,716,526 | 12/1987 | Mori et al. | 710/129 |
| 5,214,570 | 5/1993 | Shah et al. | 361/412 |
| 5,276,864 | 1/1994 | Hernandez et al. | 710/129 |
| 5,297,272 | 3/1994 | Lu et al. | 395/500 |
| 5,432,913 | 7/1995 | Smits et al. | 710/63 |
| 5,437,041 | 7/1995 | Wakabayashi et al. | 712/1 |
| 5,611,057 | 3/1997 | Pecone et al. | 395/282 |
| 5,628,637 | 5/1997 | Pecone et al. | 439/74 |
| 5,678,011 | 10/1997 | Kim et al. | 395/282 |
| 5,734,840 | 3/1998 | Chew et al. | 395/282 |
| 5,748,912 | 5/1998 | Lee | 395/282 |
| 5,754,796 | 5/1998 | Wang et al. | 395/281 |
| 5,802,325 | 9/1998 | Le Roux | 395/282 |
| 5,805,834 | 9/1998 | McKinley et al. | 395/283 |
| 5,832,294 | 11/1998 | Reinschmidt | 712/32 |
| 5,838,929 | 11/1998 | Tanikawa | 395/282 |
| 5,864,463 | 1/1999 | Tsukada et al. | 361/686 |

*Primary Examiner*—Ayaz R. Sheikh
*Assistant Examiner*—Raymond N Phan
*Attorney, Agent, or Firm*—Haynes & Boone, L.L.P.

[57] ABSTRACT

A computer system includes a motherboard to which a selected one of various processor boards can be coupled via an adaptor. The boards include a CPU and a heat transfer member. The adaptor includes core logic such as a Northbridge module and power control circuitry. The adaptor is pin connectable to the motherboard and the various processor boards are each pin connectable to the adaptor. Alternatively, the adaptor and processor boards can be replaced with a processor module including features of the processor boards and the adaptor. The processor module is also pin connectable to the motherboard at the same connection used by the adaptor.

8 Claims, 3 Drawing Sheets

ADAPTOR BOARD INTERCONNECTION FOR A PROCESSOR BOARD AND MOTHERBOARD

BACKGROUND

The disclosures herein relate generally to portable computers and more particularly to an adaptor for interconnecting a processor board to a motherboard.

In the manufacture of portable computers, certain processing capabilities are provided. These capabilities change periodically with updates providing different and/or expanded capabilities such as a different speed or an Accelerated Graphics Port (AGP). The AGP is a high performance, component level interconnect intended to enhance graphics performance and three dimensional (3D) graphics applications in particular.

Initially, manufacturers purchased a chip on a tape carrier to connect to the motherboard. The trend then turned to a "daughterboard" configuration called a processor module, pin connected directly to the motherboard and including a processor, associated circuitry, a heat transfer plate to remove heat from the processor, part of the chip set known as a Northbridge module, and connectors. The Northbridge module controls the main memory, secondary cache, peripheral component interconnect (PCI) bus, a central processing unit (CPU) and an AGP.

New features or capabilities are sometimes offered in modules smaller than the processor module configuration which can be referred to as processor boards. These smaller modules typically include a CPU and an adjacent heat transfer plate and are pin connected to the motherboard. Other circuit features, usually provided on the processor module, are located elsewhere in the system. Showers, technologies may skip from processor modules to processor boards and vice versa. This requires a new motherboard configuration for each update of these modules. Also, manufacturers who have system designs structured around utilizing processor modules which include Northbridge modules, will not be able to provide AGP capable systems without significant delay. Also, some manufacturers prefer processor boards over the daughterboards including the Northbridge modules.

Therefore, what is needed is an apparatus and a method of connecting the changing updated versions of the processor board to the motherboard without having to change the motherboard to accommodate each updated version, or alternatively, connecting a processor module directly to the same motherboard, and accomplishing both without compromising the geometry and location of the heat transfer plate.

SUMMARY

One embodiment, accordingly, provides a method and apparatus of selectively connecting one of several different versions of the processor board to the same motherboard. To this end, a computer system includes an adaptor including core logic and power control circuitry, a first connector for receiving a processor board to be mounted on the adaptor, and a second connector for mounting the adaptor onto a motherboard.

A principal advantage of this embodiment is that it allows for connecting updated versions of processor boards to the adaptor which can be pin connected to the motherboard. Alternatively, when a processor module becomes available, the processor module can be pin connected to the same connector directly onto the motherboard.

DETAILED DESCRIPTION OF THE PREFERRED EMBODIMENT

Figure 1:
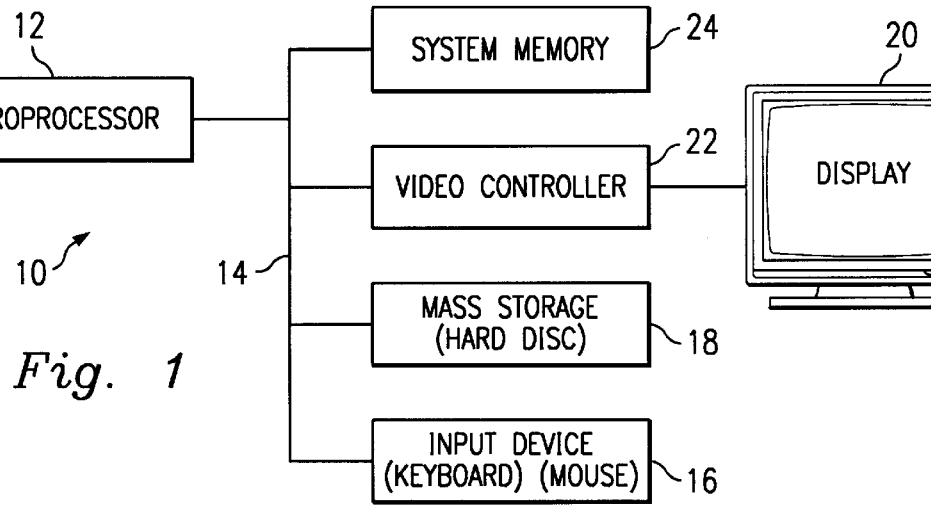
FIG. 1 is a diagrammatic view illustrating an embodiment of a computer system.

In one embodiment, a computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
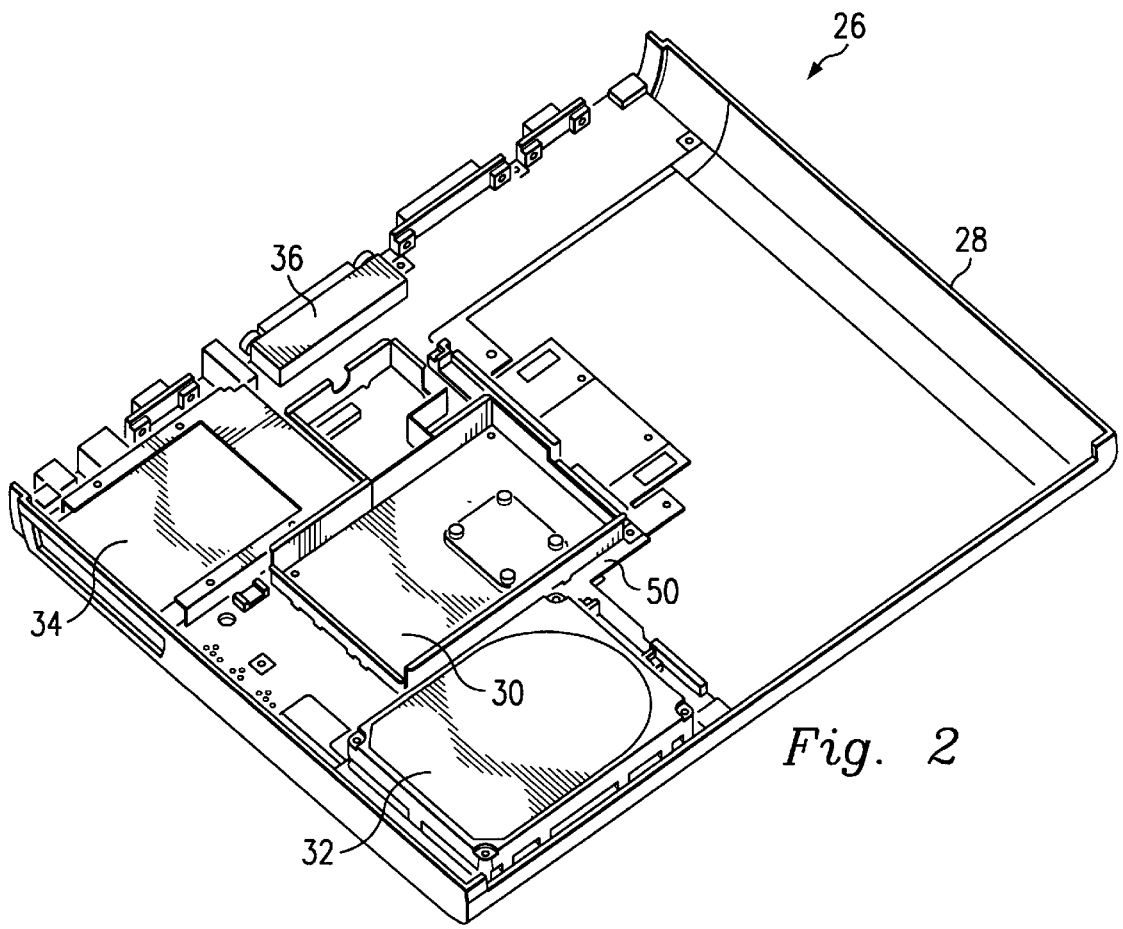
FIG. 2 is an isometric view partially illustrating an embodiment of a computer chassis.
Figure 3:
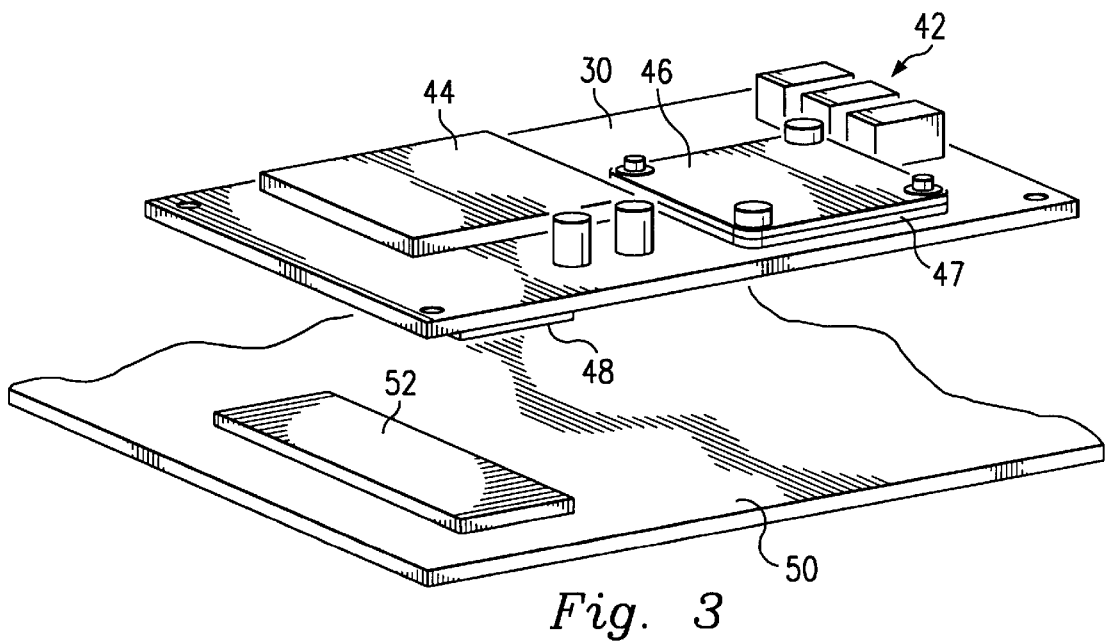
FIG. 3 is an isometric view illustrating an embodiment of a processor module and an associated motherboard.

In FIG. 2, a computer chassis 26 of system 10 includes a partial chassis housing 28 for housing a processor module 30, a hard disk drive 32, PC card slots 34, input-output connectors 36, and a motherboard 50, as examples some of the major components. Processor module 30, FIG. 3, includes well-known supporting electronics 42, core logic 44 including a Northbridge module, a thermal transfer plate 46 which abuts a processor (CPU) 47, and a connector 48 for connecting module 30 directly to motherboard 50 via a motherboard connector 52.

Figure 4:
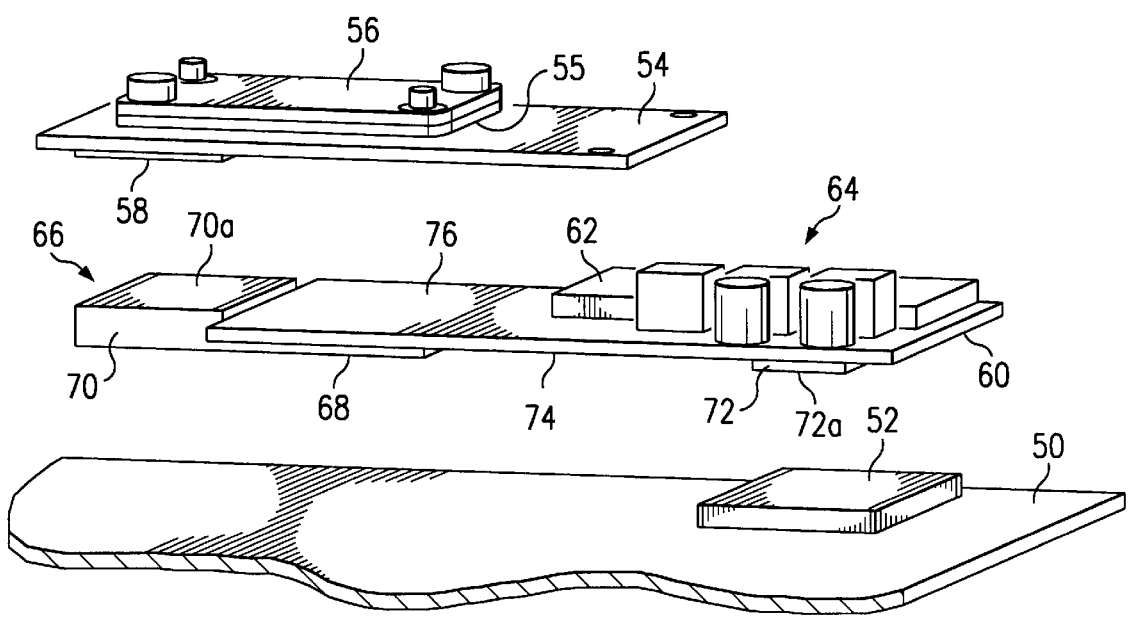
FIG. 4 is an isometric view illustrating an embodiment of a processor board, and an associated adaptor and motherboard.

New features or capabilities, e.g. AGP, may become available in a smaller form factor such as a processor board 54, FIG. 4. Board 54 includes a processor 55, mounted in abutment with a thermal transfer plate 56 and a connector 58 which may not be pin compatible with motherboard connector 52, and systems structured around utilizing Northbridge modules.

Figure 5A:
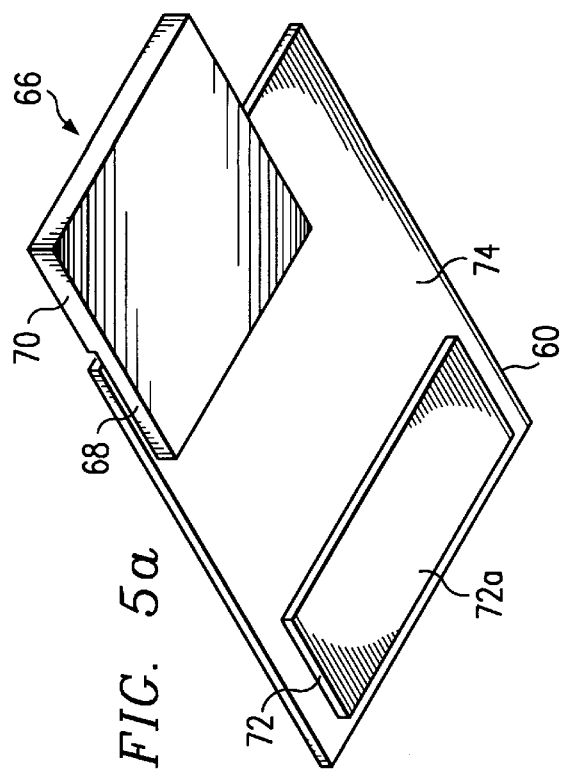
FIG. 5a is an isometric view illustrating an embodiment of an inverted adaptor.

An adaptor board 60, FIG. 4, is provided to interconnect processor board 54 and motherboard 50. Adaptor board 60, FIGS. 5 and 5a, includes a core logic 62 and a plurality of supporting electronics 64. Core logic 62 includes a Northbridge module and the supporting electronics 64 include power control circuitry. Board 60, FIG. 5a, has a first side 74 supporting a first connector 66 and a second connector 72.

Figure 5:
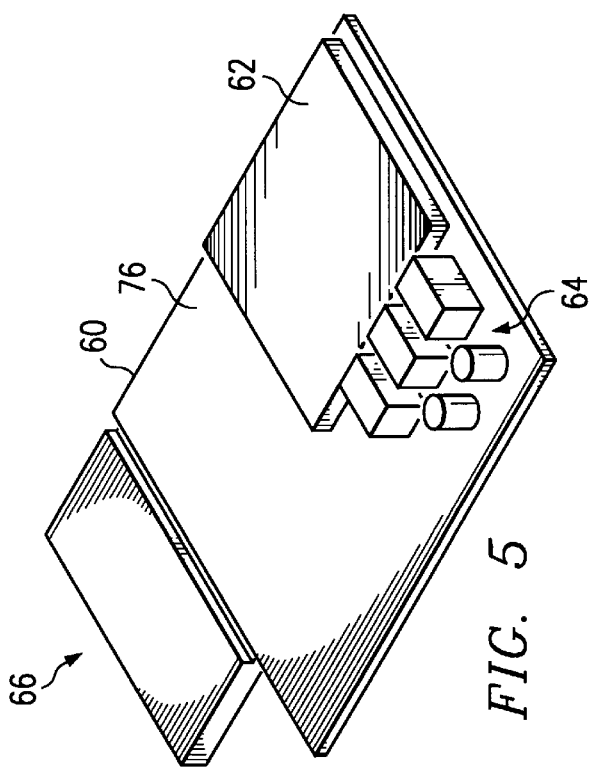
FIG. 5 is an isometric view illustrating an embodiment of the adaptor.

A second side 76, FIG. 5, of board 60 supports the core logic 62 and electronics 64. First connector 66 is a right angle connector having a first end 68, FIG. 5a, connected to board 60 and a right angle portion at a second end 70 configured to be connected to connector 58, FIG. 4, of processor board 54. Second connector 72 is mounted on adaptor board 60 and is configured to be connected to connector 52 of motherboard 50.

Adaptor board 60, FIG. 4, has first side 74 positioned adjacent motherboard 50 and second side 76, positioned adjacent processor board 54. In this manner, adaptor board 60 may be sandwiched between motherboard 50 and processor board 54, discussed below. First end 68 of first connector 66 is mounted on first side 74 of board 60. Second end 70 of connector 66 extends to a position adjacent second side 76 of adaptor board 60 by virtue of the right angle portion which positions a surface 70a of second end 70 for connection to connector 58 of processor board 54. Second connector 72 is mounted on first side 74 of adaptor board 60 and includes a surface 72a, FIGS. 4 and 5a, positioned for connection to connector 52 of motherboard 50.

Figure 6:
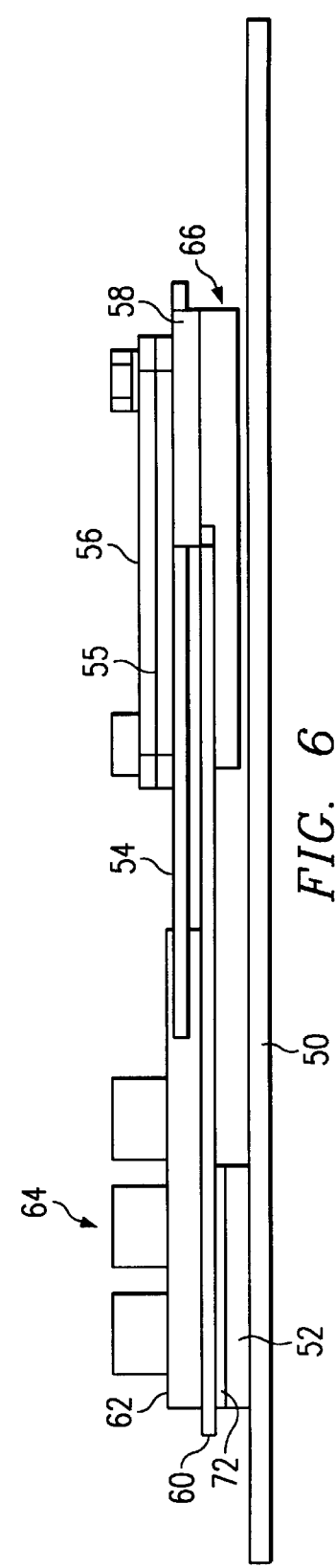
FIG. 6 is a side view illustrating an embodiment of the adaptor coupled to the motherboard and to the processor board.

In operation, referring to FIG. 6, adaptor board 60 is connected to motherboard 50 due to the pin connection between motherboard connector 52 and adaptor board connector 72. Processor board 54 is connected to adaptor board 60 due to the pin connection between processor board connector 58 and adaptor board connector 66 so that adaptor board 60 is sandwiched between motherboard 50 and processor board 54. Other processor boards with various features may be selectively coupled to adaptor board 60. Alternatively, adaptor board 60 may be removed and a pin compatible processor module 30, FIG. 3, may be connected directly to motherboard 50.

As it can be seen, the principal advantages of these embodiments are that the adaptor board provides an interface or medium for coupling one or more processor boards to the motherboard so that the system functions in a manner similar to when a processor module is coupled directly to the same motherboard. The motherboard connectors accept either the adaptor or the processor module so that no board changes are required. The adaptor incorporates elements of the processor module that are missing from the processor board. Thermal connections of the processor board and processor module are the same, i.e. height, geometry, function, etc. Thus, the smaller processor board, in combination with the adaptor, functions the same as the larger processor module when connected to the motherboard.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:
    an adaptor board including core logic and power control circuitry on a first side and including a first and a second connector on a second side;
    a processor board adjacent the first side;
    a motherboard adjacent the second side;
    the first connector having a first portion electrically connected to the second side of the adaptor board and a second portion electrically connected to the processor board, the second portion extending from the second side of the adaptor board to adjacent an edge portion of the first side of the adaptor board; and
    the second connector electrically connected to the second side of the adaptor board and to the motherboard.
2. The computer system as defined in claim 1 wherein the core logic includes a Northbridge module and the first connector is a right angle connector.
3. The computer system as defined in claim 1 wherein the first connector is a right angle connector.
4. A computer system comprising:
    an adaptor board including core logic and power control circuitry on a first side and including a first and a second connector on a second side;
    a processor board including a CPU and a heat transfer member adjacent the first side;
    a motherboard adjacent the second side;
    the first connector having a first portion electrically connected to the second side of the adaptor board and a second portion electrically connected to the processor board, the second portion extending from the second side of the adaptor board to adjacent an edge portion of the first side of the adaptor board; and
    the second connector electrically connected to the second side of the adaptor board and to the motherboard.
5. The computer system as defined in claim 4 wherein the core logic includes a Northbridge module.
6. The computer system as defined in claim 5 wherein the first connector is a right angle connector.
7. A method of selectively coupling one a plurality of various processor boards to a motherboard comprising the steps of:
    providing an adaptor board including core logic and power control circuitry on a first side and providing a first and a second connector on a second side;
    mounting a selected processor board, including a CPU and a heat transfer member, adjacent the first side;
    mounting the motherboard adjacent the second side;
    electrically connecting a first portion of the first connector to the second side of the adaptor board;
    electrically connecting a second portion of the first connector to the processor board, the second portion extending from the second side of the adaptor board to adjacent an edge portion of the first side of the adaptor board; and
    electrically connecting the second connector to the second side of the adaptor board and to the motherboard.
8. A computer system comprising:
    a chassis;
    a microprocessor mounted in the chassis;
    an input coupled to provide input to the microprocessor;
    a mass storage coupled to the microprocessor;
    a display coupled to the microprocessor by a video controller;
    a memory coupled to provide storage to facilitate execution of computer programs by the microprocessor;
    an adaptor board including core logic and power control circuitry on a first side and including a first and a second connector on a second side;
    a processor board including a CPU and a heart transfer member adjacent the first side;
    a motherboard adjacent the second side;
    the first connector having a first portion electrically connected to the second side of the adaptor board and a second portion electrically connected to the processor board, the second portion extending from the second side of the adaptor board to adjacent an edge portion of the first side of the adaptor board; and the second connector electrically connected to the second side of the adaptor board and to the motherboard.

\* \* \* \* \*

UNITED STATES PATENT AND TRADEMARK OFFICE
CERTIFICATE OF CORRECTION

PATENT NO. : 5,987,553
DATED : November 16, 1999
INVENTOR(S) : Deepak N. Swamy et al.

It is certified that error appears in the above-identified patent and that said Letters Patent is hereby corrected as shown below:

Column 1,
Line 33, after "system.", delete "Showers." and insert -- However, --.

Signed and Sealed this

Second Day of April, 2002

*Attest:*

JAMES E. ROGAN
*Attesting Officer*    *Director of the United States Patent and Trademark Office*